United States Patent
Wawro

(10) Patent No.: US 8,434,950 B1
(45) Date of Patent: May 7, 2013

(54) AERIAL PHOTOGRAPHY MOUNT

(76) Inventor: Christopher Wawro, East Troy, WI (US)

( * ) Notice: Subject to any disclaimer, the term of this patent is extended or adjusted under 35 U.S.C. 154(b) by 0 days.

(21) Appl. No.: 13/410,694

(22) Filed: Mar. 2, 2012

Related U.S. Application Data

(60) Provisional application No. 61/448,959, filed on Mar. 3, 2011.

(51) Int. Cl.
    *G03B 39/00* (2006.01)
(52) U.S. Cl.
    USPC ............... 396/419; 248/121; 248/126; 396/7; 396/12; 396/13
(58) Field of Classification Search .................. None
    See application file for complete search history.

(56) References Cited

U.S. PATENT DOCUMENTS

| | | |
|---|---|---|
| 2,506,095 A | 5/1950 | Mantz |
| 2,883,863 A | 4/1959 | Karsten |
| 3,044,346 A | 7/1962 | Fieux |
| 3,638,502 A | 2/1972 | Leavitt |
| 4,044,364 A | 8/1977 | Prinzo |
| 4,218,702 A | 8/1980 | Brocard |
| 4,669,843 A | 6/1987 | Bozzolato |
| 4,825,232 A | 4/1989 | Howdle |
| 5,231,435 A | 7/1993 | Blakely |
| 5,426,476 A | 6/1995 | Fussell |
| 5,531,403 A | 7/1996 | Tyler |
| 5,765,043 A | 6/1998 | Tyler |
| 5,884,867 A | 3/1999 | Gordon |
| 5,995,758 A | 11/1999 | Tyler |
| 6,209,834 B1 | 4/2001 | Stonehouse |
| 6,424,804 B1 | 7/2002 | Johnson |
| 7,068,927 B2 | 6/2006 | Itzkowitz |
| 7,264,220 B2 | 9/2007 | Dent |

OTHER PUBLICATIONS

Wimberly, Inc., WH-200 Operating Instructions, Aug. 8, 2006, Winchester, VA.
Kenyon Laboratories, LLC, Operating instructions for your Kenyon Gyro Stabilizer, Mar. 16, 2004, p. 7, Essex, CT.

*Primary Examiner* — Clayton E LaBalle
*Assistant Examiner* — Kevin Butler
(74) *Attorney, Agent, or Firm* — Bert P. Krages, II

(57) ABSTRACT

An aerial photography mount that features a three-axis gimbal unit that is supported between two posts by elastic straps. Each of the axes rotates within precision bearings that enable smooth operation of a camera secured to the mount. The elastic straps, in conjunction with independently rotating bearings at the end suspension assemblies, provide a enhanced vibration isolation effect. The mount can be further stabilized by the attachment of gyroscopic stabilizers.

16 Claims, 5 Drawing Sheets

AERIAL PHOTOGRAPHY MOUNT

CROSS-REFERENCED TO RELATED APPLICATIONS

This application claims the benefit of provisional application 61/448,959 which was filed on Mar. 3, 2011.

FIELD OF THE INVENTION

The invention relates generally to the field of aerial photography mounts.

BACKGROUND OF THE INVENTION

The taking of photographs and video from platforms such as aircraft and other modes of transportation is highly desirable for many applications but is made difficult because of the vibration that is transmitted to the camera causes movements that degrade the visual quality of the images. Compounding the problem is the need by many photographers to be able to selectively aim the imaging device within the confines of a small space. It is especially desirable that an aerial photography mount be portable and capable of being secured to a variety of aircraft, ground vehicles, and watercraft in a manner that allows the operator to position the camera relative to a variety of openings. What is needed for many applications is a mount that stabilizes the camera, reduces the level of vibration, and simultaneously allows the operator to selectively aim the camera within a wide field of view.

SUMMARY OF THE INVENTION

The invention is an aerial photography mount that features a three-axis gimbal unit that is supported between two posts by elastic straps. For the purposes of this specification, the three axes or rotation (yaw, roll, and pitch) are referenced with the yaw axis being centered on the vertical axis of a vertical center post on which the camera is mounted, the pitch axis being centered along two bearings mounted inside the central gimbal pivot frame, and the roll axis being centered on the longitudinal axis aligned with the bearings mounted in end suspension assemblies residing outside the central gimbal frame. When the mount is used in small aircraft, it will generally be oriented facing an opening in the side of the aircraft so as to encompass a viewing angle that will range from about 30 to 150 degrees away from the longitudinal axis of the aircraft. For that reason, the roll, and pitch axes used to describe the mount in this specification may not be identical to the roll and pitch axes of the aircraft in which the mount is secured, particularly if the mount is secured in a forward- or backward-facing position in the aircraft, vessel, or ground vehicle.

The innermost member of the gimbal unit is a vertical gimbal post assembly that rotates around the yaw-axis within precision bearings that enable the upper and lower members to rotate freely about a middle member. The upper member can be connected to an imaging device such a still or video camera, or preferably, to a tripod head to which a camera is mounted. The bottom member has a plate for mounting gyroscopic stabilizers. The forces generated by the gyroscopic stabilizers keep the gimbal assembly steady in space thus allowing for smooth image capture with fluid, near-friction free movement for panning and counteracting movements induced by yaw, roll, and pitch. The upper and lower members are connected, preferably by a bolt that runs through the middle member, and thus the upper and lower members rotate in unison.

The middle member of the vertical gimbal post assembly is connected to a central gimbal frame by a set of opposing bearings that are mounted in the central gimbal frame. Spacers serve the function of providing separation distance between the middle member and the inner face of the central gimbal frame. Because the bearings and spacers are centered on a common axis, this arrangement allows the gimbal post assembly to swing freely about the pitch axis.

The exterior of the central gimbal frame is connected via bearings to gimbal end suspension assemblies located on opposite sides of the central gimbal frame. Side posts provide separation distance between the central gimbal frame and the end suspension assemblies. The side posts and bearings are aligned on an axis of rotation that is perpendicular to the pitch axis and thus allow the central gimbal frame to rotate about the roll axis.

In the preferred embodiment, the gimbal unit is attached to a pair of frame posts by elastic straps that connect the gimbal end suspension assemblies to side blocks that can be set to a desired position on the frame posts. The frame posts are mounted on a cross rail and the cross rail is mounted on parallel base rails. The position of the posts on the cross rail may be adjusted to vary the distance between the rails. Similarly, the position of the cross rail may be adjusted relative to the base rails and thus permits a fore-and-aft adjustment relative to an opening in the aircraft to enable placement of the camera. Although the preferred embodiment contemplates a pair of frame posts that are mounted on the adjustable rail arrangement described above, it should be noted that the gimbal unit may be attached to any two mounting points capable of receiving the free ends of the elastic straps (i.e., the ends not secured to the end suspension assemblies). For example, the gimbal unit could be attached to mounting points installed on the opposite sides of an opening such as a door frame.

One of the advantages of the design is the enhanced degree of vibration reduction with respect to the gimbal unit. This is accomplished by use of the elastic straps which act to reduce the amount of vibration transmitted to the camera in conjunction with high-quality bearings in the gimbal end suspension points that rotate independently and freely of each other. The ability to rotate independently, with very low friction, and without a common axle, produces a noticeable degree of enhanced vibration damping over mounts that rely on elastic straps alone.

Another important feature of the mount is that all the axes of rotation are associated with bearings and supporting elements that are located between the end suspension assemblies and thus each axis or rotation receives the benefit of vibration damping induced by the elastic straps and the end suspension assemblies. This permits the camera to be panned smoothly along each of the axes because none of the rotational axes reside outside the dampening mechanisms where they are subject to the undampened vibration from the aircraft, vessel, or ground vehicle.

Another important advantage of the design is that it allows the camera to be rotated around three axes and thus enables the camera operator to more effectively adjust the orientation of the camera with respect to the horizon while maintaining the direction in which the camera is pointed. This feature is particularly desirable with respect to aerial photography because images encompassing the horizon can be disorientating to viewers if the horizon is not maintained in a substantially horizontal position in images. Because the nature of aerial photography does not always allow images to be retaken, the flexibility of operation enabled by the three-axis gimbal assembly offers a significant practical advantage over systems in which the camera is controlled through substantially two axes because the camera can be positioned in a more reliable manner.

Another advantage is that the framework is configured in a manner as to provide full adjustability of the unit. The gimbal suspension blocks can be adjusted independently for height. They can be set evenly or at any height to adjust for the attitude of the aircraft. This permits the gimbal unit to be leveled taking into account the default pitch of the aircraft in flight so that the camera is initially level with the horizon. The framework can be easily adjusted fore-and-aft and side-to-side by loosening fasteners on the cross rail and base rails and simply sliding them to the desired positions and tightening to lock them in place. This degree of adjustability allows for a high degree of control over placement of the camera within the confines of an aircraft.

Many types of fixed wing aircraft have seat rails that are suitable for securing the mount. This can be done by setting the base rails on the seat rails, positioning them appropriately, and then securing by t-slot clamps which are slid onto the seat rails and tightened so that the mount does not move. Thus, a design feature of the mount is that it can be used in a Cessna-type high wing aircraft with seat rails allowing for safe single pilot photographer operations. For use in helicopters, the unit can be strapped down via the base rails by means such as belt loop brackets. Other means of attachment such as straps, clamps, and bolts can also be used to secure the mount.

DETAILED DESCRIPTION OF THE PREFERRED EMBODIMENT

Figure 1:
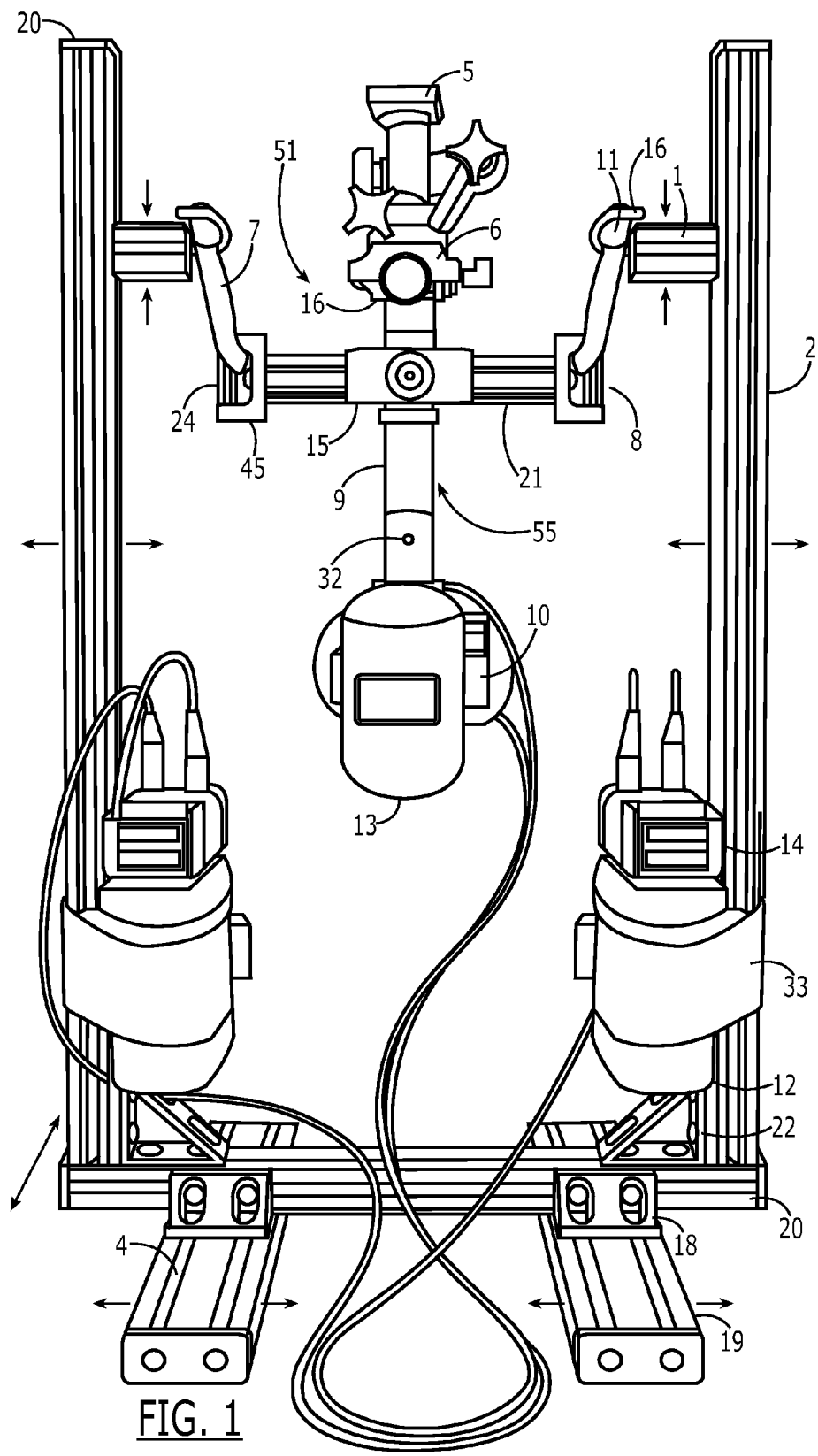
FIG. 1 is a front view of the aerial photography mount.

As shown in FIGS. 1-5, the preferred embodiment of the mount comprises a gimbal unit assembly 51 having a vertical post assembly 55, a central gimbal frame 15, and gimbal end suspension assemblies 8. The vertical gimbal post assembly 55 and the end suspension assemblies 8 are connected to the central gimbal frame 15 in a manner described more specifically below that permits a camera mounted to the vertical post assembly 55 to be moved freely and simultaneously through the yaw, roll, and pitch axes. The gimbal unit assembly 51 is suspended from elastic straps 7 that connect the end suspension assemblies 8 to hooks 11 on post blocks 1 which in turn are connected to a pair of posts 2. This means of suspension dampens the vibrations of the aircraft that would otherwise be transmitted to the gimbal unit assembly 51.

Figure 3:
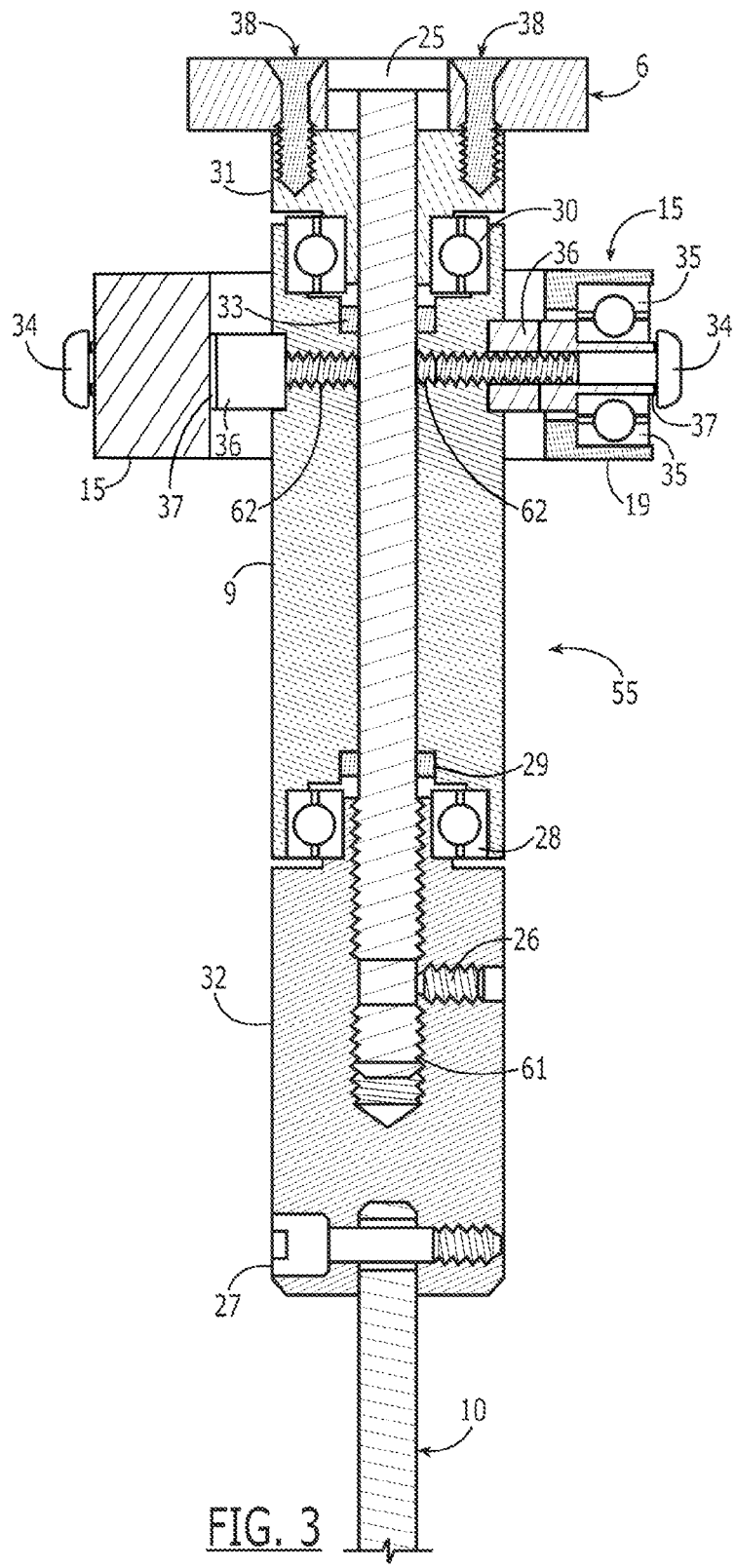
FIG. 3 is a side view of the vertical gimbal post.
Figure 5:
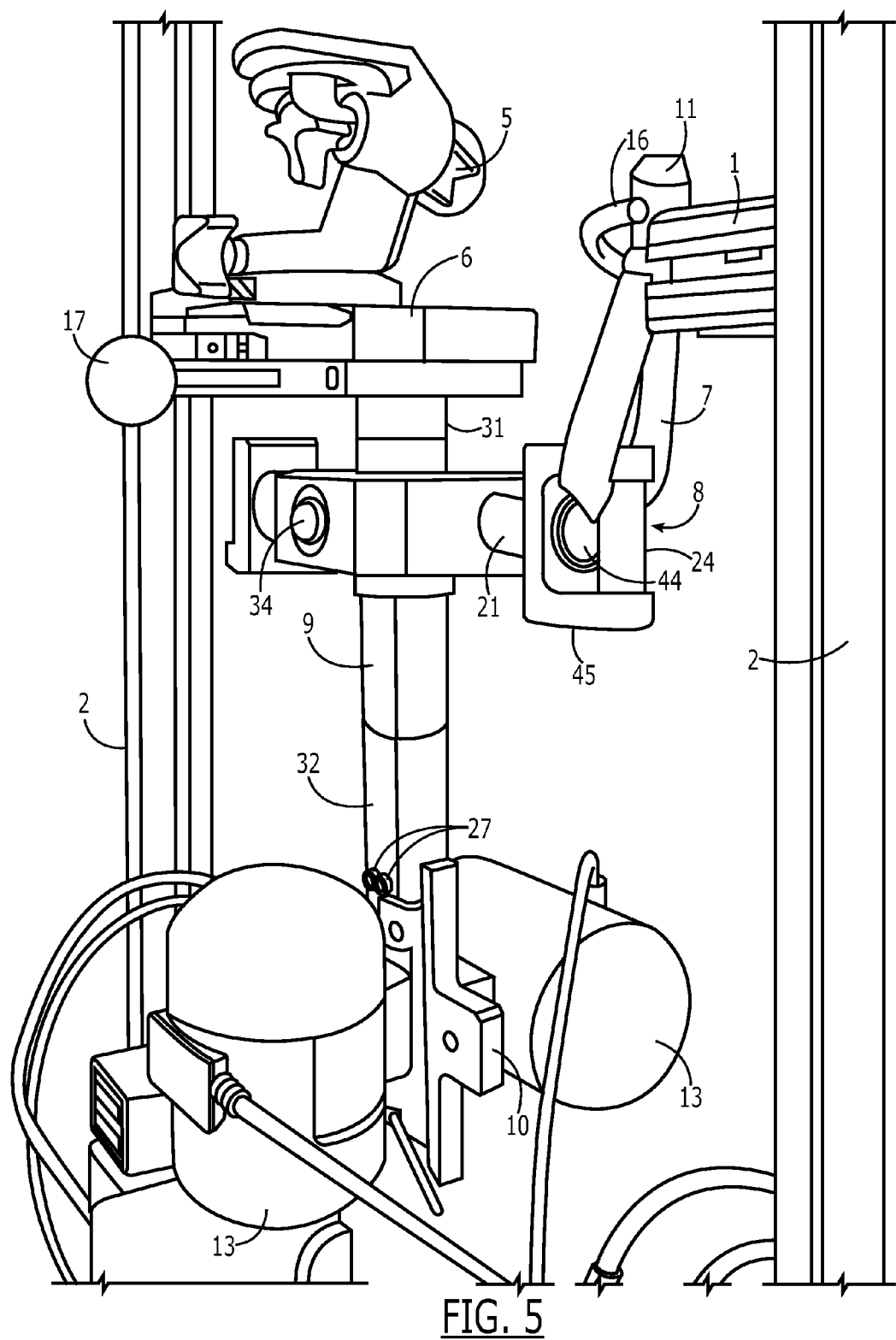
FIG. 5 is a side-rear perspective view of the gimbal unit and frame posts.

As shown in FIGS. 1 and 3, the vertical gimbal post assembly 55 comprises a camera mount base 16 for the attachment of a base mount plate 6 and tripod head 5 at the upper end and a gyro mount plate 10 for mounting gyroscopic stabilizers 13 at the bottom end. As shown in more detail in FIG. 3, a circular camera mount base 6 is fastened above the top post member 31 by a pair of screws 38. An alternative, as depicted in FIGS. 1 and 5, is to use a camera mount base 6 of the quick release variety. The bottom end of the top post member 31 is press fit to the inside the inner race of bearing 30. The bearing 30 concurrently resides in a recess in the upper end of the middle post member 9 with a light push fit. A bronze bushing 33 is located beneath the bearing 30 but does not engage the bearing. The vertical gimbal post assembly 55 also comprises a bottom post member 32 in which the upper end is press fit to the inside of the inner race of bearing 28. The bearing 28 concurrently resides in a recess at the lower end of the middle post member 9 with a light push fit. Another bronze bushing 29 is located above the bearing 28 but does not engage the bearing. The top post member 31 is connected to the bottom post member 32 by a bolt 25 that extends though the center of the top post member 31 and through the middle post member 9 into the bottom post member where it engages a threaded section 61 and is further secured by a set screw 26. This arrangement allows the top post member 31 and the bottom post member 32 to rotate freely relative to the middle post member 9.

Figure 2:
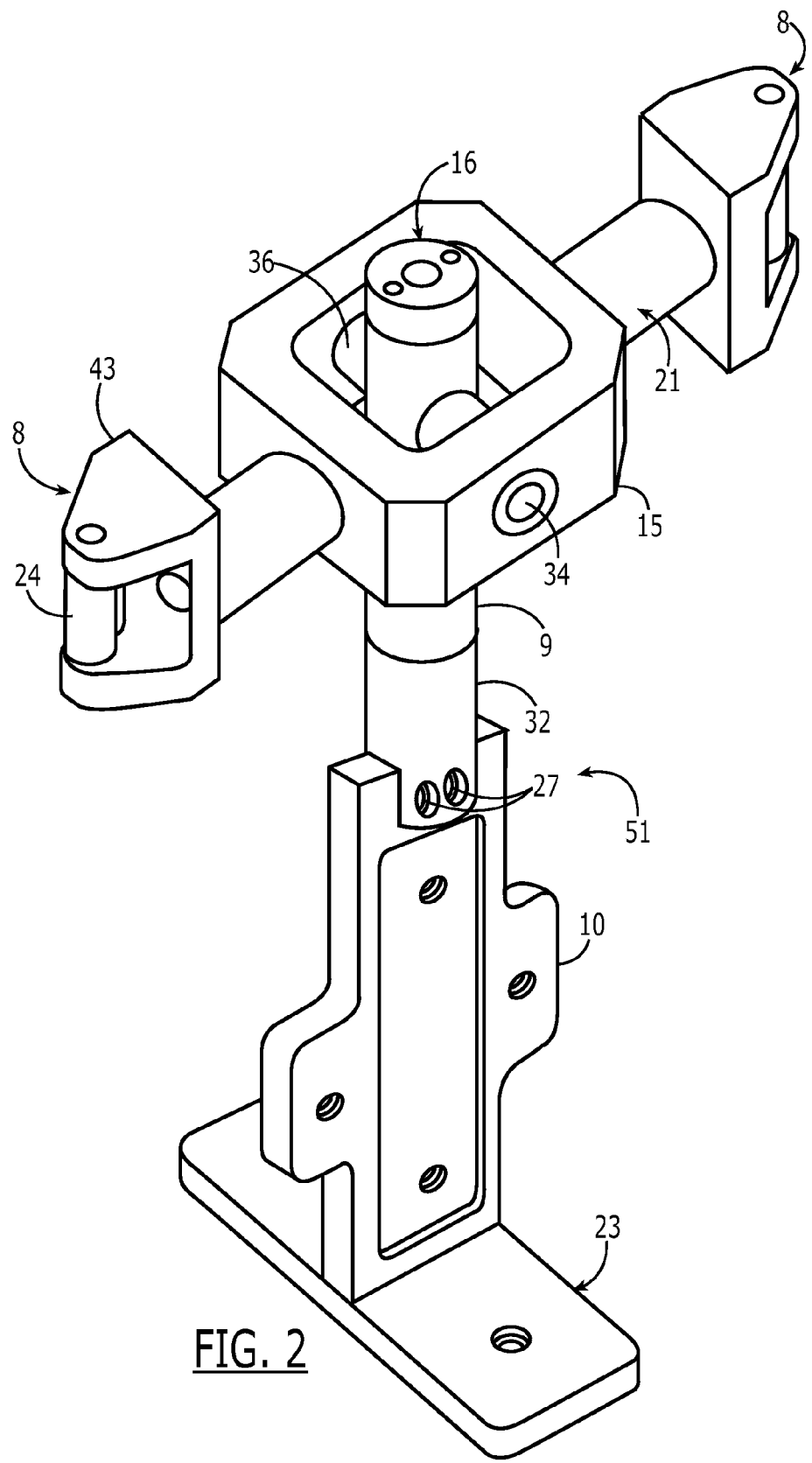
FIG. 2 is a perspective view of the gimbal unit.

As shown in FIGS. 1, 2, and 3, a gyro mounting plate 10 is fastened to the bottom post member 32 by screws 27. The gyro mounting plate 10 is preferably configured in a cruciform arrangement that enable gyroscopic stabilizers 13 to be mounted with their spin axes aligned respectively in parallel with the roll and yaw axes of the gimbal unit. If desired, an auxiliary gyroscopic stabilizer plate 23 may be fastened to the bottom end of the gyroscopic stabilizer plate 10 to enable a third gyroscopic stabilizer (not shown) to be mounted with its spin axis in parallel alignment with the pitch axis. Similar, if desired, counterweights may be fastened to the gyroscopic stabilizer plate 10 or the auxiliary gyroscopic stabilizer plate 23 to provide ballast to ensure that the camera is maintained in a balanced position above the central gimbal frame 15.

Also shown in FIG. 3, hollow spacers 36 have a proximal end that engage recesses on opposing sides of the middle post member 9 with a slight push fit. Bushings 37 engages the inner side of the inner race of bearings 35 with a slight push fit. The bearings 35 are press fitted into recesses in opposing sides of the central gimbal frame 15 The bushings 37 are aligned with the spacers 36 and bolts 34 pass through the bushings 37 and the spacers 36 and secured to the threaded side openings 62 in the middle post member 9 so as to connect the vertical gimbal post assembly 55 to the central gimbal frame 15. This arrangement allows the vertical post assembly 55 to pivot about the pitch axis.

Figure 4:
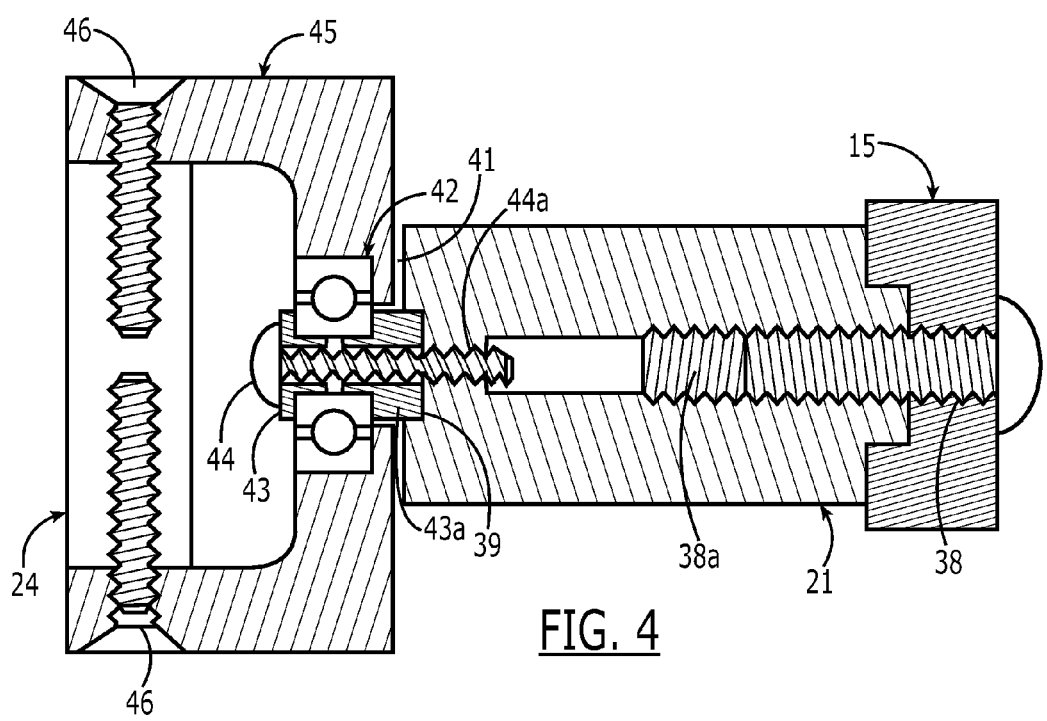
FIG. 4 is a side view showing a side post connecting the central gimbal frame to a gimbal end suspension assembly.

As shown in FIGS. 2 and 4, the central gimbal frame 15 is connected to the gimbal end suspension assemblies 8 by side posts 21. The side posts 21 consist of a cylindrical member with a threaded opening 38a at the proximal end and a threaded opening 44a at the distal end, The proximal end of the side post 21 is connected to the central gimbal frame 15 by a bolt 38 that is threaded into opening 38a. The end suspension assembly 8 comprises a housing 45 to which a strap support post 24 is secured by screws 46 that pass through opposing sides of the housing 45 and are threaded into the strap support post 24. The outer circumference of bearing 42 is press fit into the housing 45. The small circumference ends of two shouldered bushings 43 and 43a are press fit from opposite ends into the inner circumference of the bearing 42. The large circumference end of bushing 43a extends from the face of housing 45 and fits within a recess 39 of side post 21 such that a small gap 41 is present between the housing 45 and side post 21. A bolt 44 passes through the hole in the bushing 43 and is threaded into opening 44a thus securing the end suspension assembly 8 onto the side post 21. This arrangement allows the central frame 15 to pivot about the roll axis when the mount is facing out from the side of an aircraft.

As shown in FIGS. 1 and 5, the gimbal unit assembly is attached by elastic bands 7 that wrap around strap support post 24 and are secured to hooks 16 by stopper knots 11. The hooks 16 in turn are mounted on side blocks 1 that can be selectively positioned upwards or downwards on posts 2. If desired, safety cables (not shown) can be attached between the hooks 16 and the end suspension assemblies 8 to prevent the elastic straps 7 from overextending or to protect the equipment in the event a strap 7 were to break. The posts 2 are connected to a cross rail 20 via gussets 22 which allow the posts 2 to be selectively positioned laterally along the cross rail 20. The cross rail 20 is connected to a pair of bottom rails 19 by brackets 18 which are retained in grooves 4. The bottom rails 19 may be selectively positioned fore-and-aft by adjusting the gussets 18. The battery packs 14 for the gyroscopic stabilizers sit on the battery trays 12 and are secured via retaining straps 33 which are wrapped around the posts 2. In operation, the bottom rails are secured to the aircraft or other mode of transport, generally within the compartment in which the pilot, driver, or passengers reside. For example, the bottom rails 19 may be attached to the seat rails of an aircraft. Modes of attachment such as straps, clamps, and bolts can also be used to removably secure the mount to an aircraft, vehicle, or watercraft. The adjustability of the side blocks 1, posts 2, and bottom rails 19 allows for a high degree of flexibility with respect to adjusting the position of the gimbal unit assembly 51 relative to an opening or to the operator of the camera.

The bearings 28, 30, 35, and 42 are an important aspect of the mount because they enable smooth movement and refined control of the camera by the operator. Of particular importance are bearings 42 in the end suspension assemblies 8 because they provide an unexpected degree of vibration damping over aerial photography mounts that utilize elastic suspension members to support the assembly to which the camera is fastened but which do not utilize independently-rotating bearings along the roll axis of rotation. The term bearings when used in this specification refers specifically to ball bearings or roller bearings. The bearings are preferably double-sealed, deep-groove ball bearings of the types commonly designated as 6200-RS, 6201-RS, and 99502H, although other types may be used.

The elastic bands 7 can be made of any material that has sufficient elasticity to absorb vibration and sufficient tensile strength to support the gimbal assembly 51 when fitted with a camera, gyroscopic stabilizers 13, and any counterweights. A particularly suitable form consists of cords made from multiple strands of elastic material, typically rubber, which are bound together by a woven nylon fabric covering. Flat strap bungee material is readily available and also functions well. To handle heavier weight loads, the bands can be dual looped through the end suspension assemblies 8 and the hooks 16. Single and dual loop suspensions can be bound together with wire ties and then encapsulated with an industrial heat shrink tubing with adhesive coating on the inner diameter. Alternative materials include premolded silicone bands which can be formed in different durometers to handle varying equipment weight combinations.

Tripod heads 5 are very useful in mounting cameras because they permit rapid and accurate adjustment so that the initial position of the camera may be preset to a desired degree of forward tilt. An example of a suitable head is the MANFROTTO Model 460MG.

Gyroscopic stabilizers 13 are used to stabilize the movement about all three axes of rotation and can be adjustably positioned on the gyro mount plate 10 through the center lines of the respective axes. A suitable gyroscopic stabilizer for the mount is the model KS-8 made by Kenyon Laboratories LLC. Further adjustments to the balance and center of gravity of the gimbal unit 51 can be made by moving and securing weights onto the gyro mount plate 10.

To operate the mount, the gyroscopic stabilizers 13 are activated and allowed to reach their operating rate of rotation. The gyroscopic stabilizers 13 exert a stabilizing effect along the axes of rotation and thus tend to restrain the camera from being jostled or incurring other inadvertent motion. The camera operator can direct the position of the camera by smoothly moving and aiming the camera with respect to the desired position. To facilitate control over the camera, the base mount plate 6 can be fitted with a handle 17, as shown in FIG. 5, which the camera operator may hold and thus direct the position of the camera without touching the camera itself.

It will be apparent to those skilled in the art that various modifications and variations can be made to the present invention without departing from its scope and spirit. Thus, it is intended that the present invention covers the modifications and variations that come within the scope of the claims and their equivalents.

I claim:

1. A photography mount for stabilizing a camera, the mount comprising:
   a gimbal assembly configured to provide rotation about first, second, and third axes of rotation that are substantially perpendicular to each other, said gimbal assembly further comprising:
   a central gimbal frame having an inner face and an outer face;
   a vertical post assembly further comprising a top member that is fixedly linked to a bottom member, said vertical post assembly having at least one first axis bearing engaged with a middle member and either the top member or the bottom member to enable said top member and said bottom member to rotate together about the first axis of rotation;
   said middle member mounted to the inner face of a central gimbal frame by opposing side posts that are connected to second axis bearings to enable said vertical post assembly to rotate about the second axis of rotation;
   said outer face of the central gimbal frame mounted to two opposing end suspension assemblies having engagement to third axis bearings to enable said central gimbal frame to rotate about the third axis of rotation;
   said top member of the vertical post assembly having an equipment attachment element; whereas
   said gimbal assembly is suspended between elastic straps having first and second ends, with said first ends connected to said end suspension assemblies.

2. The photography mount of claim 1 further comprising attachment points to which the second ends of said elastic straps are connected.

3. The photography mount of claim 2 further comprising upright posts to which the attachment points are connected.

4. The photography mount of claim 3 in which said attachment points are selectively and independently positionable on said upright posts.

5. The photography mount of claim 4 in which said upright posts are mounted on a cross rail.

6. The photography mount of claim 5 in which said upright posts are selectively positional on said cross rail.

7. The photography mount of claim 6 in which said cross rail is selectively positional on at least one bottom rail.

8. A photography mount for stabilizing a camera, the mount comprising:
- a gimbal assembly configured to provide rotation about first, second, and third axes of rotation that are substantially perpendicular to each other, said gimbal assembly further comprising:
  - a central gimbal frame having an inner face and an outer face;
  - a vertical post assembly further comprising a top member that is fixedly linked to a bottom member, said vertical post assembly having at least one first axis bearing engaged with a middle member and either the top member or the bottom member to enable said top member and said bottom member to rotate together about the first axis of rotation;
  - said middle member mounted to the inner face of a central gimbal frame by opposing side posts that are connected to second axis bearings to enable said vertical post assembly to rotate about the second axis of rotation;
  - said outer face of the central gimbal frame mounted to two opposing end suspension assemblies having engagement to third axis bearings to enable said central gimbal frame to rotate about the third axis of rotation;
  - said top member of the vertical post assembly having an equipment attachment element;
  - said bottom member of the vertical post assembly having a gyroscope stabilizer attachment element; whereas
- said gimbal assembly is suspended between elastic straps having first and second ends, with said first ends connected to said end suspension assemblies.

9. The photography mount of claim 8 further comprising attachment points to which the second ends of said elastic straps are connected.

10. The photography mount of claim 9 further comprising upright posts to which the attachment points are connected.

11. The photography mount of claim 10 in which said attachment points are selectively and independently positionable on said upright posts.

12. The photography mount of claim 11 in which said upright posts are mounted on a cross rail.

13. The photography mount of claim 12 in which said upright posts are selectively positionable on said cross rail.

14. The photography mount of claim 13 in which said cross rail is selectively positionable on at least one bottom rail.

15. The photography mount of claim 8 in which the first axis bearing, second axis bearings, and third axis bearings are ball bearings.

16. A photography mount for stabilizing a camera, the mount comprising:
- a gimbal assembly configured to provide rotation about first, second, and third axes of rotation that are substantially perpendicular to each other, said gimbal assembly further comprising:
  - a central gimbal frame having an inner face and an outer face;
  - a vertical post assembly comprising a top member that is fixedly connected to a bottom member by a connecting member passing within an opening in a middle member, with said connecting member positioned within the inner race of a first vertical post bearing that engages the top member and middle member and the inner race of a second vertical post bearing that engages the bottom member and the middle member, so as to enable said top member and said bottom member to rotate in unison about a first axis of rotation;
  - said middle member mounted to the inner face of a central gimbal frame by opposing side posts that are connected to second axis bearings to enable said vertical post assembly to rotate about the second axis of rotation;
  - said outer face of the central gimbal frame mounted to two opposing end suspension assemblies having engagement with third axis bearings to enable said central gimbal frame to rotate about the third rotation axis between the end suspension assemblies;
  - said top member of the vertical post assembly having an equipment attachment element;
  - said bottom member of the vertical post assembly having a gyroscope stabilizer attachment element;
- said gimbal assembly suspended between elastic straps having first and second ends, with said first ends connected to said end suspension assemblies and said second ends of said elastic straps connected to attachment points that are selectively and independently positionable on upright posts; and whereas
- said upright posts are mounted in a selectively positionable manner on a cross rail and said cross rail is connected in a selectively positionable manner on at least one bottom base member.

* * * * *